W. C. LAWSON.
TRAMWAY SYSTEM.
APPLICATION FILED APR. 20, 1911.

996,653.

Patented July 4, 1911.
2 SHEETS—SHEET 1.

Inventor:
William C. Lawson

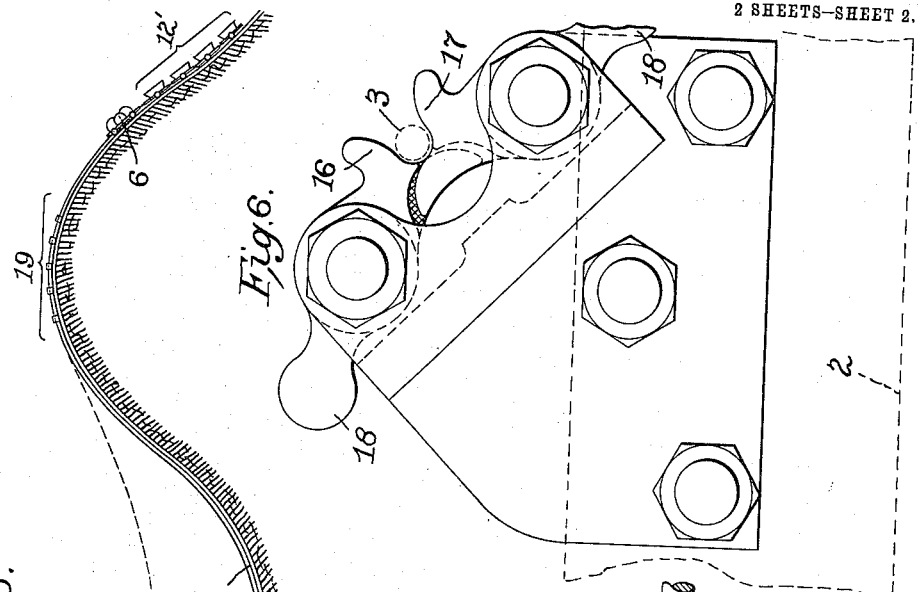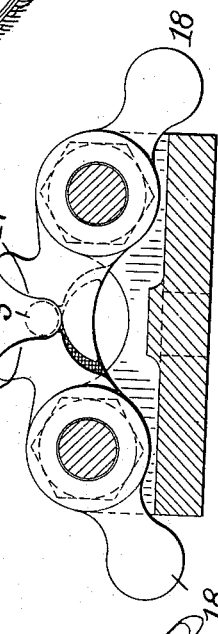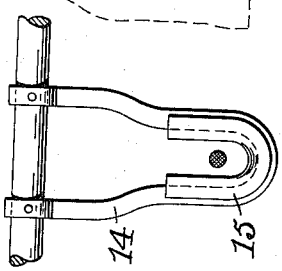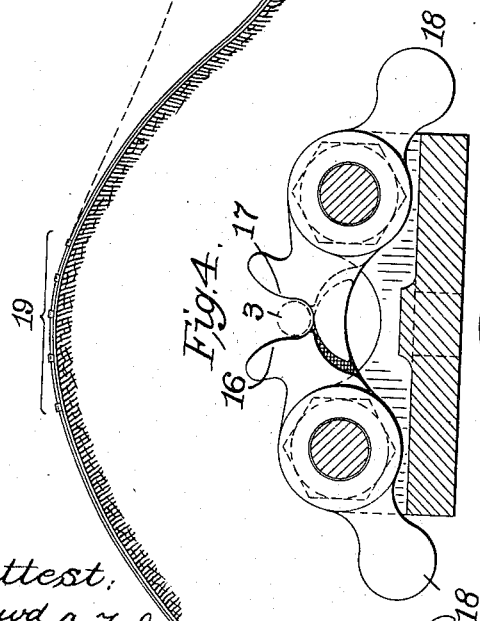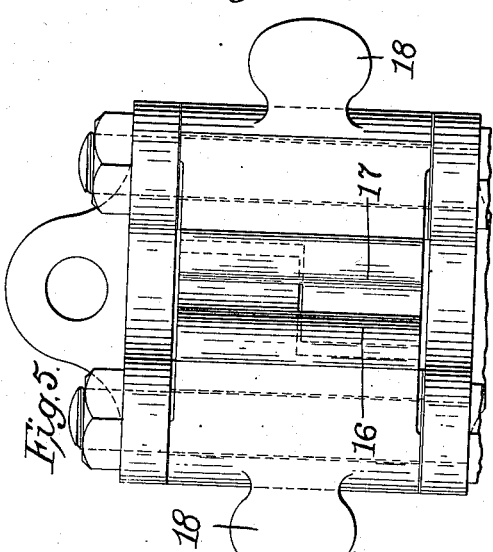

UNITED STATES PATENT OFFICE.

WILLIAM C. LAWSON, OF ROANOKE, VIRGINIA.

TRAMWAY SYSTEM.

996,653.

Specification of Letters Patent. Patented July 4, 1911.

Application filed April 20, 1911. Serial No. 622,375.

*To all whom it may concern:*

Be it known that I, WILLIAM C. LAWSON, citizen of the United States, residing at Roanoke, Virginia, have invented certain new and useful Improvements in Tramway Systems, of which the following is a specification.

My invention is designed to provide a self contained propelling truck carrying its own motor and traveling by driving contact through a stationary cable, my improved device being used for hauling cars in the transportation of coal or other material, and adapted as well for use in either an undulatory or hilly country as on level tracts of land.

In carrying out my invention I utilize an ordinary railway track upon which the propelling truck runs, using a fixed cable which passes around drums on the driving truck and, through a motor mounted on the truck, the cable drums are rotated, the cable being wound and unwound permitting the movement of the truck over any distance and enabling the truck to haul loaded cars with perfect ease and more effectually than where cables are used having direct connection with the cars, as in such structures the effective distance is necessarily limited in which an ordinary hauling cable can successfully operate. It will, of course, be understood that one of the difficulties to be overcome in my system is to prevent the slipping of the cable between the ridges where the country is undulatory or hilly, but I have overcome this difficulty by the improvements hereinafter particularly set forth.

Figure 1:
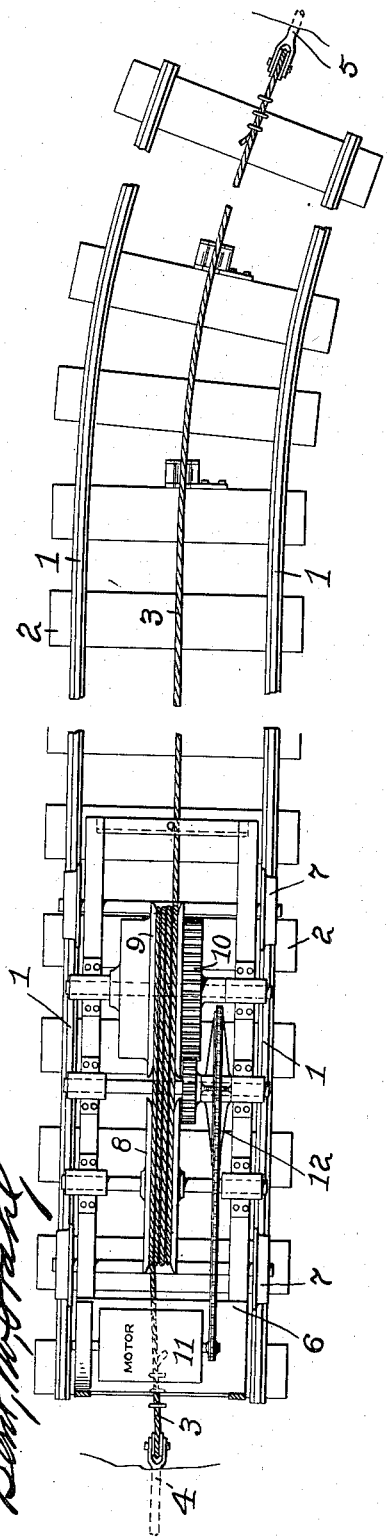
Figure 2:
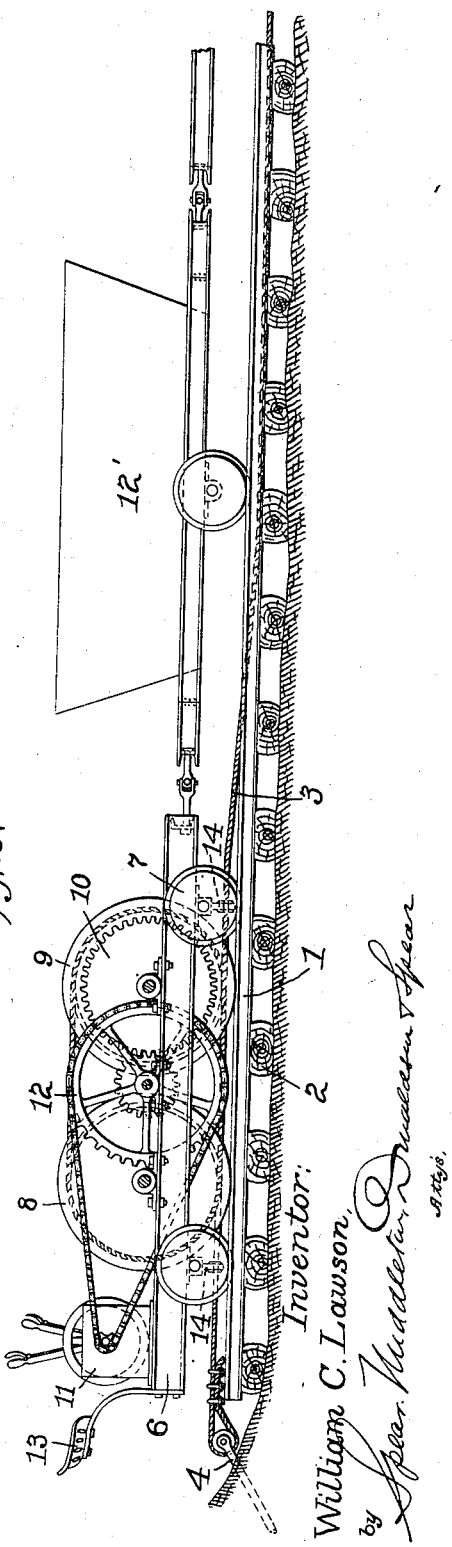

In the accompanying drawing, Figure 1 is a plan view of a part of a road bed and a plan view of the truck. Fig. 2 is a side elevation of the same showing one of the cars connected with the truck. Fig. 3 is a diagrammatic view, and Figs. 4, 5, 6 and 7 show details.

In these drawings, 1 represents the rails, 2 the ties and 3 the cable which is anchored at 4 and 5 at its ends. The truck 6 is mounted on wheels 7, running on the track, and the truck carries cable drums 8, 9, with a train of gearing 10, driven from a motor 11 through a sprocket wheel and chain 12. The cable 3 passes around the drums 9 and 8 as shown, before passing on to the opposite anchored point and the result is that as the cable drums are driven through the gearing the truck is moved along by its grip upon the cable.

The cars for transporting material may be of any suitable shape and number as shown at 12′ in Fig. 2, and in series in Fig. 3. A seat is provided at 13 for the driver of the motor and suitable handles are utilized to control the motor.

In order to form guides for the cable as it passes to and from the cable drums I support from the front and rear axle of the truck, as shown in Fig. 7, a yoke 14 of substantially U shape having a bearing supported at the bottom of the U, and protecting the cable from undue wear against the yoke, this bearing being of manganese or any suitable material. This bearing is interposed between the cable and the edges of the yoke and is of such a configuration in cross section as to fit around the inner edges of the yoke covering the bottom and readily removable and replaceable. This bearing is shown at 15.

The tendency of the cable is to lift when under the weight of the truck and cars as shown in Fig. 3, from the surface of the valley or depression between high points, the tendency of the lifting action being shown in dotted lines, and it is one of the objects of the invention to prevent this, and I accomplish it by the use of a grip shown in Figs. 4, 5 and 6. As shown in these figures the cable rests normally between the jaws 16 and 17, the counterweights 18 holding the jaws raised so that the cable is free to lift, but if there is any pull upon the cable such as the strain of the truck and cars mounting the hill side the cable is immediately depressed between the jaws, overcoming the counterweights and the jaws tightly grip the cable preventing any longitudinal movement until the strain is relieved. In the diagram of Fig. 3 I have shown the position of the grips at 19, but they may, of course, be located wherever found necessary. Where the cable is carried around the side of the hill I have placed the grip at an angle or an inclined position as shown in Fig. 6.

What I claim is:—

1. A tramway system comprising suitable rails, a cable anchored at its ends, a truck, cable drums, the cable being wound around said drums, a motor for driving the drums to cause the truck to travel along the rails and automatic means to prevent lifting of the cable, substantially as described.

2. In a tramway system, suitable rails, a cable, a truck having cable drums around which the cable is wound, and guide yokes for the cable having removable self centering bearings of soft material to prevent contact of the cable with the yokes, substantially as described.

3. In a tramway system, a cable having its ends anchored, a truck having cable drums around which the cable passes, means for driving the drums to propel the truck, and grips arranged along the line of the cable and adapted to automatically operate to hold the cable fast through longitudinal strain applied to the cable and to automatically release the cable when the strain is relieved, substantially as described.

In testimony whereof, I affix my signature in presence of two witnesses.

WILLIAM C. LAWSON.

Witnesses:
CHAS. W. BISHOP,
E. W. SPEED.